United States Patent [19]
Massetti

[11] Patent Number: 5,974,299
[45] Date of Patent: Oct. 26, 1999

[54] AUDIENCE RATING SYSTEM FOR DIGITAL TELEVISION AND RADIO

[76] Inventor: Enrico Emilio Massetti, 2432 Treemont Way, Dunedin, Fla. 34698

[21] Appl. No.: 09/085,501

[22] Filed: May 27, 1998

[51] Int. Cl.$^6$ ..................................................... H04N 7/16
[52] U.S. Cl. .................................................. 455/2; 348/1
[58] Field of Search .............................. 455/2, 4.2, 5.1, 455/6.1, 6.2, 6.3; 348/1, 2, 3, 4, 5, 10, 12, 13; H04N 7/16, 7/173

[56] References Cited

U.S. PATENT DOCUMENTS

| | | |
|---|---|---|
| 4,547,804 | 10/1985 | Greenberg . |
| 4,647,974 | 3/1987 | Butler et al. . |
| 4,697,209 | 9/1987 | Kiewit et al. . |
| 4,972,503 | 11/1990 | Zurlinden . |
| 5,019,899 | 5/1991 | Boles et al. . |
| 5,278,988 | 1/1994 | Dejean et al. . |
| 5,425,100 | 6/1995 | Thomas et al. . |
| 5,450,122 | 9/1995 | Keene . |
| 5,450,490 | 9/1995 | Jensen et al. . |
| 5,512,933 | 4/1996 | Wheatley et al. . |
| 5,532,732 | 7/1996 | Yuen et al. ................................. 348/1 |
| 5,574,962 | 11/1996 | Fardeau et al. . |
| 5,594,934 | 1/1997 | Lu et al. ..................................... 455/2 |
| 5,646,675 | 7/1997 | Copriviza et al. . |
| 5,659,350 | 8/1997 | Hendricks et al. ......................... 348/6 |
| 5,872,588 | 2/1999 | Aras et al. ................................. 348/1 |

Primary Examiner—Chris Grant
Attorney, Agent, or Firm—Stephen Christopher Swift

[57] ABSTRACT

An audience rating system for digital television and radio, using identification codes in control streams of time-multiplexed digital transmissions. When a television set or radio, that is being monitored pursuant to the system, is turned on and tuned into a channel, and each time that the channel is changed, an identification code for each audio, video or auxiliary digital stream of the channel is extracted from the control stream, and recorded along with the time. The time is also recorded when the television set or radio is turned off. This data makes it possible to determine what stations, channels, and programs members of the audience being monitored are watching or listening to at any particular time. In the first preferred embodiment, the multiplexed digital transmission is received separately by the television set or radio (or an attached IRD) and a meter connected to it. The meter compares digital streams of the channel being received by the television set or radio with digital streams of each of the channels in the multiplexed digital transmission, until it finds a match. In the second preferred embodiment, the meter does not receive the multiplexed digital transmission separately, but has access to elementary streams extracted from the transmission by an IRD, and extracts identification codes for the channels being received from their elementary streams. The elementary stream may be accessed through an auxiliary connector in a digital decoder, through an access control card connector, or through soldering electrical connections to internal points in the IRD.

20 Claims, 4 Drawing Sheets

AUDIENCE RATING SYSTEM FOR DIGITAL TELEVISION AND RADIO

BACKGROUND OF THE INVENTION

1. Field of the Invention

The present invention relates to methods and apparatus for audience rating systems for digital television and radio.

2. Description of the Prior Art

The television and radio industries and commercial advertisers have an obvious interest in knowing how many people are watching or listening to particular stations and programs. Various systems of audience rating have been developed for analog television and radio, of which the most accurate use a meter that is connected to the television set or radio, that records when the receiver is turned on and off, and what channels or frequencies it is tuned to. Digital television and radio are now being introduced, and are expected to eventually completely replace analog television and radio. The existing rating devices for analog televison and radio either will not work at all with digital television and radio, or will work only poorly. The present invention is a method of audience rating for digital television and radio, that uses an apparatus that can be connected to a digital televison set or radio. It makes use of identification codes in the control stream of multiplexed digital transmissions to record the channel being received.

U.S. Pat. No. 4,547,804, issued on Oct. 15, 1985, Burton L. Greenberg, discloses a method and apparatus for the automatic identification and verification of commercial broadcast programs. A digital encoded identifying number is embedded in the programs, by which they can be automatically monitored, to verify that they have been broadcast as and when intended. However, the digital number is embedded in what is otherwise an analog program. This method is usable only during the transition period from analog to digital broadcasting technology, when some digital equipment or connection is in use together with older analog equipment or connections. It will not work when the broadcasting stations have fully digital operations, e.g., recording a program in digital form, storing it digitally on tape or disk, performing nonlinear digital edits and digital commercial insertions, and transmitting digitally in the air, or delivering a digital stream to a cable or satellite operator to multiplex with other digital streams. The instant invention is distinguishable, in that it is fully digital and will work with broadcasting that is fully digital, and it is designed for audience ratings, rather than broadcast verification.

U.S. Pat. No. 4,647,974, issued on Mar. 3, 1987, to Robert J. Butler and Ronald G. Schlameuss, discloses a system for the automatic insertion of auxiliary video information into an analog television signal. The system may be used by a local station to insert its call letters or logo into network programming. The instant invention is distinguishable, in that it uses digital signals in digital broadcasts, and is designed to monitor receivers.

U.S. Pat. No. 4,697,209, issued on Sep. 29, 1987, to David Kiewit and Daozheng Lu, discloses a method and apparatus for identifying television programs, by detecting the occurrence of events such as scene changes in a video signal, and extracting a signature from the signal. Signatures and their times of occurrence are stored and compared with reference signatures to identify the program. As the system is independent of the format used to transmit the signal, it will work with both analog and digital television. It has the disadvantage of requiring that a large volume of reference data be collected for every possible station and program being transmitted, and for every site monitored, which will require a large computing capacity and a long computing time to correlate the two sets of data to determine which station or program is being received at each monitored site at each instant that each receiver is turned on. The instant invention is distinguishable, in that it is designed to monitor the reception of digital transmissions only, and will work efficiently with such transmissions, by using identification codes in their control streams.

U.S. Pat. No. 4,972,503, issued on Nov. 20, 1990, to Everett V. Zurlinden, discloses a method and apparatus for determining the channel to which a remotely controlled television receiver is tuned. While it is independent of the format (analog or digital) used to transmit the signal, its implementation on a mass scale for audience ratings will not be practical, as it requires an individual hardware or software adaptation to each remote control used in the monitored sites to determine what function is activated when a key pressing is detected. The instant invention is distinguishable, in that requires no such adaptation to remote controls, and may be implemented even if a remote control is not used.

U.S. Pat. No. 5,019,899, issued on May 28, 1991, to Glenn M. Boles et al., discloses an electronic data encoding and recognition system for creating digital signatures from frames of selected video segments such as television commercials by a digitalizing, compression and selection process which produces a multi-digit signature from each frame. The instant invention is distinguishable, in that it uses digital signals in digital broadcasts, and may be used to monitor receivers.

U.S. Pat. No. 5,278,988, issued on Jan. 11, 1994, to Jean P. Dejean, Enrico Massetti, Ken Straub and Everett Zurlinden, discloses a method and apparatus for determining the transmitting station from which analog program signals are received and translated by a monitored receiver within a test area. The instant invention is distinguishable, in that it is designed to detect and. record the reception of digital transmissions by digital receivers.

U.S. Pat. No. 5,425,100, issued on Jun. 13, 1995, to William L. Thomas, Paul C. Kempter and David H. Harkness, discloses a multi-level encoded signal monitoring system and a universal broadcast code for identifying programs, commercial, networks, stations, etc. The instant invention is distinguishable, in that it is designed for and will work with fully digital programming, and does not require multiple levels of encoding.

U.S. Pat No. 5,450,122, issued on Sep. 12, 1995, to Leonard D. Keene, discloses an in-station method and apparatus for encoding analog television programs, including commercials, with a digital identification code recorded on a selected video scan line which is not normally visible to the television viewer, and for verifying the proper airing of such programs by television broadcast stations. The instant invention is distinguishable, in that it is designed for determining audience ratings for digital television and radio.

U.S. Pat. No. 5,450,490, issued on Sep. 12, 1995, to James M. Jensen et al., discloses apparatus and methods for including an inaudible code in an analog audio signal, and for decoding it. The instant invention is distinguishable, in that it uses identification codes in the control streams of multiplexed digital transmissions.

U.S. Pat. No. 5,512,933, issued on Apr. 30, 1996, to Mark A. Wheatley and Peter Wilcox, discloses a system for identifying a program stream being displayed at a receiver location, by measuring the relative luminance of a plurality of predetermined areas in each frame of a television transmission, at both the transmitting station and the receiver. As the system is independent of the format used to transmit the signal, it will work with both analog and digital television. But, as with Kiewit et al., supra, it has the disadvantage of requiring that a large volume of reference data be collected for every possible station and program being transmitted, and for every site monitored, as well as requiring a large computing capacity and a long computing time to correlate the two sets of data to determine which station or program has been received at each monitored site at each instant that the receiver was turned on. As before, the instant invention is distinguishable, in that it is designed to monitor the reception of digital transmissions only, and will work efficiently with such transmissions, by using identification codes in their control streams.

U.S. Pat. No. 5,574,962, issued on Nov. 12, 1996, to Michel Fardeau et al., discloses a method and apparatus for automatically identifying a program, by adding an inaudible encoded message to the audio signal. The instant invention is distinguishable, in that it is designed for multiplexed digital transmissions, and uses identification codes already present in their control streams.

U.S. Pat. No. 5,646,675, issued on Jul. 8, 1997, to Robert C. Copriviza et al., discloses a system and method for monitoring the reception of video program material, using codes inserted on scan lines. Again, the instant invention is distinguishable, in that it is designed for multiplexed digital transmissions, and uses identification codes already present in their control streams.

None of the above inventions and patents, taken either singly or in combination, is seen to describe the instant invention as claimed.

SUMMARY OF THE INVENTION

The present invention is an audience rating system for digital television and radio, using identification codes in control streams of time-multiplexed digital transmissions. When a television set or radio, that is being monitored pursuant to the system, is turned on and tuned into a channel, and each time that the channel is changed, an identification code for each audio, video or auxiliary digital stream of the channel is extracted from the control stream, and recorded along with the time. The time is also recorded when the television set or radio is turned off. This data makes it possible to determine what stations, channels, and programs members of the audience being monitored are watching or listening to at any particular time. In the first preferred embodiment, the multiplexed digital transmission is received separately by the television set or radio (or an attached integrated receiver and decoder) and a meter connected to it. The meter compares the elementary digital streams of the channel being received by the television set or radio with digital streams of each of the channels in the multiplexed digital transmission, until it finds a match. In the second preferred embodiment, the meter does not receive the multiplexed digital transmission separately, but has access to an elementary stream extracted from the multiplexed digital transmission by an integrated receiver and decoder. In both embodiments, the meter extracts identification codes for the channels being received from the elementary stream. The elementary stream may be accessed through an auxiliary connector in a digital decoder, through an access control card connector, or through soldering electrical connections to internal points in the integrated receiver and decoder. In either embodiment, the digital transmission may be either a terrestrial or satellite broadcast, or by cable. The data recorded may be stored on-site in the meter's memory, and/or transmitted to a central computer for immediate processing. While designed as an audience rating system, the invention may also be used in recording reception of, and billing customers for, pay-per-view digital television programs (or even "pay-per-listen" digital radio programs, should any be developed).

Accordingly, it is a principal object of the invention to provide an efficient means of creating reliable audience rating reports for digital television.

It is another object of the invention to provide an efficient means of creating reliable audience rating reports for digital radio.

It is a further object of the invention to provide a means for recording reception of digital programs for which a fee is charged to the consumer.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
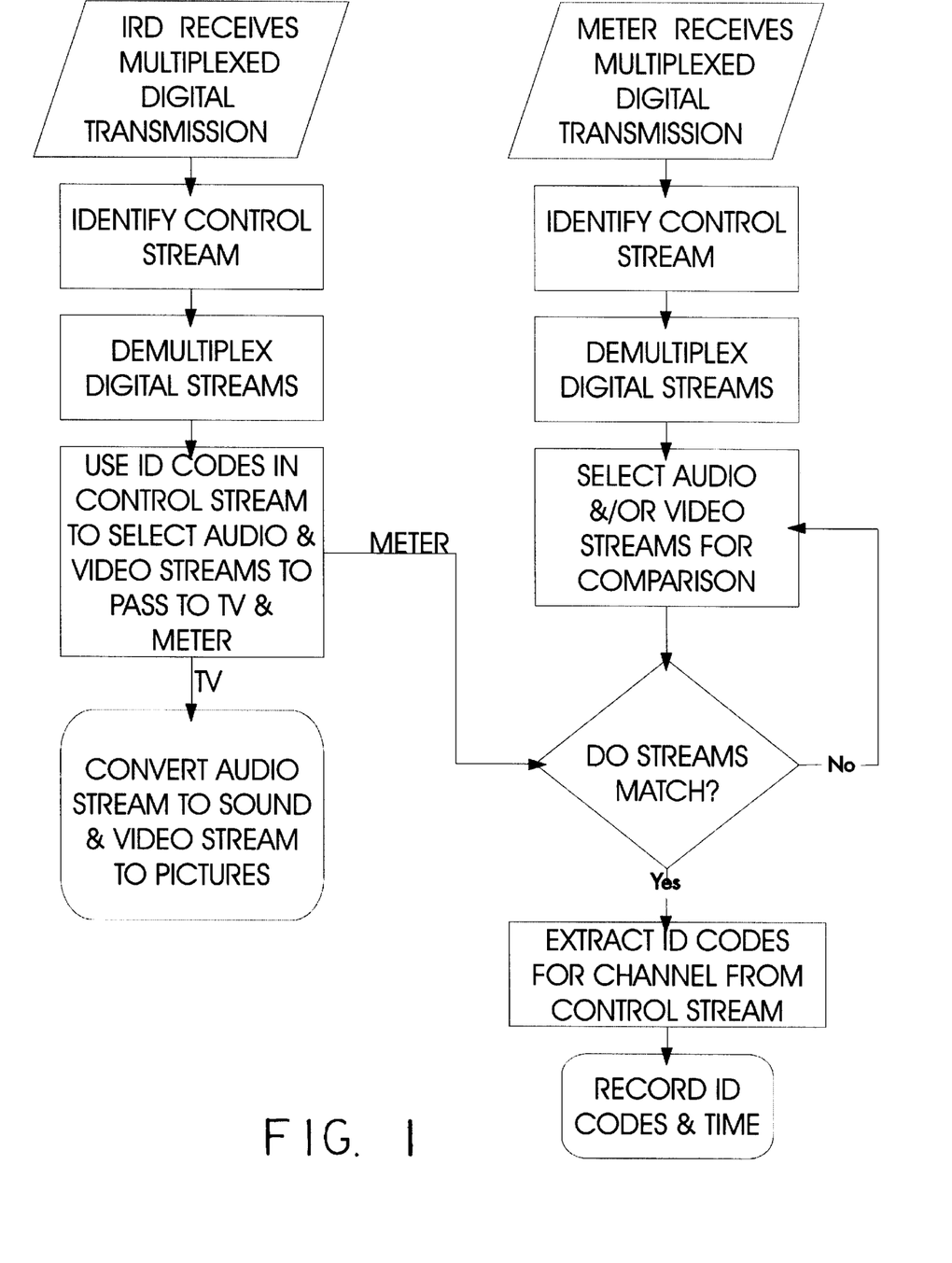
FIG. 1 is a flowchart showing the method of the first preferred embodiment of the invention.

The present invention is an audience rating system for digital television and radio, using identification codes in control streams of time-multiplexed digital transmissions. The multiplexed digital transmission may be broadcast through the atmosphere by electromagnetic radiation, and/or reflected off satellites orbiting the earth in outer space. Or it may be transmitted by electricity through metal cables, and/or by light through fiber optic cables. FIG. 1 is a flowchart illustrating the method in the first preferred embodiment of the invention. Multiplexed digital transmissions are received simultaneously by both an integrated receiver and decoder (hereinafter referred to as the "IRD") connected to the television set or radio (hereinafter referred to as the "receiver"), and by a meter which is also connected to the receiver. (IRDs are now generally separate units attached outside the receiver. But it is expected that eventually they will be placed inside digital receivers during manufacture.) Both the IRD and the receiver must then identify the control stream (sometimes also called the system stream) in the multiplexed digital transmission.

The next step is demultiplexing the multiplexed digital transmission into separate digital streams. The control stream is used to allocate digital frames to the separate digital streams. In digital television the separate digital streams include at least one video stream for each channel, at least one audio stream for each channel, the control stream itself, and may also include auxiliary streams for each channel. (In digital radio there is, of course, no video stream.) (As used in this application, a "channel" means one or more digital streams that transmit only one program or commercial advertisement at a time, and applies to digital radio as well as television.) Identification codes in the control stream are used to cause only the digital streams of the channel to which the receiver is tuned to be passed to the receiver, so that the channel's audio digital streams are converted to sound, and the channel's video digital streams are converted to pictures.

When the meter receives a signal indicating that the receiver has been turned on, or that the channel that the receiver is tuned. to has been changed, the meter selects one or more audio, video and/or auxiliary digital streams belonging to a first channel in the multiplexed digital transmission for comparison with the digital streams of the channel to which the receiver is tuned. If the comparison shows that the digital streams are identical, the meter then extracts the identification codes of the streams that match from the control stream. If the digital streams are not identical, the meter selects digital streams belonging to the next channel for comparison, and continues selecting and comparing digital streams belonging to each channel in the multiplexed digital transmission, until a match is found, and the identification codes of the matching digital streams received by the meter are extracted from the control stream received by the meter. The identification codes extracted are recorded by the meter, along with the time and date. (If no match in found, a message that the digital stream cannot be identified may be recorded.) (Alternatively, the meter may continuously compare the digital streams in each of the channels in the multiplexed digital transmission to the digital streams in the channel to which the receiver is tuned, and extract and record the identification codes and the time and date whenever the continuous comparison shows that the channel has been changed.) The meter also records the time and date when the receiver is turned off or reception is otherwise ended. Assuming that the times each program and each commercial are transmitted on each channel belonging to each station are known, the data recorded by the meter makes it possible to determine what stations, channels, programs and commercials member of the audience being monitored are watching or listening to at any particular time.

Figure 2:
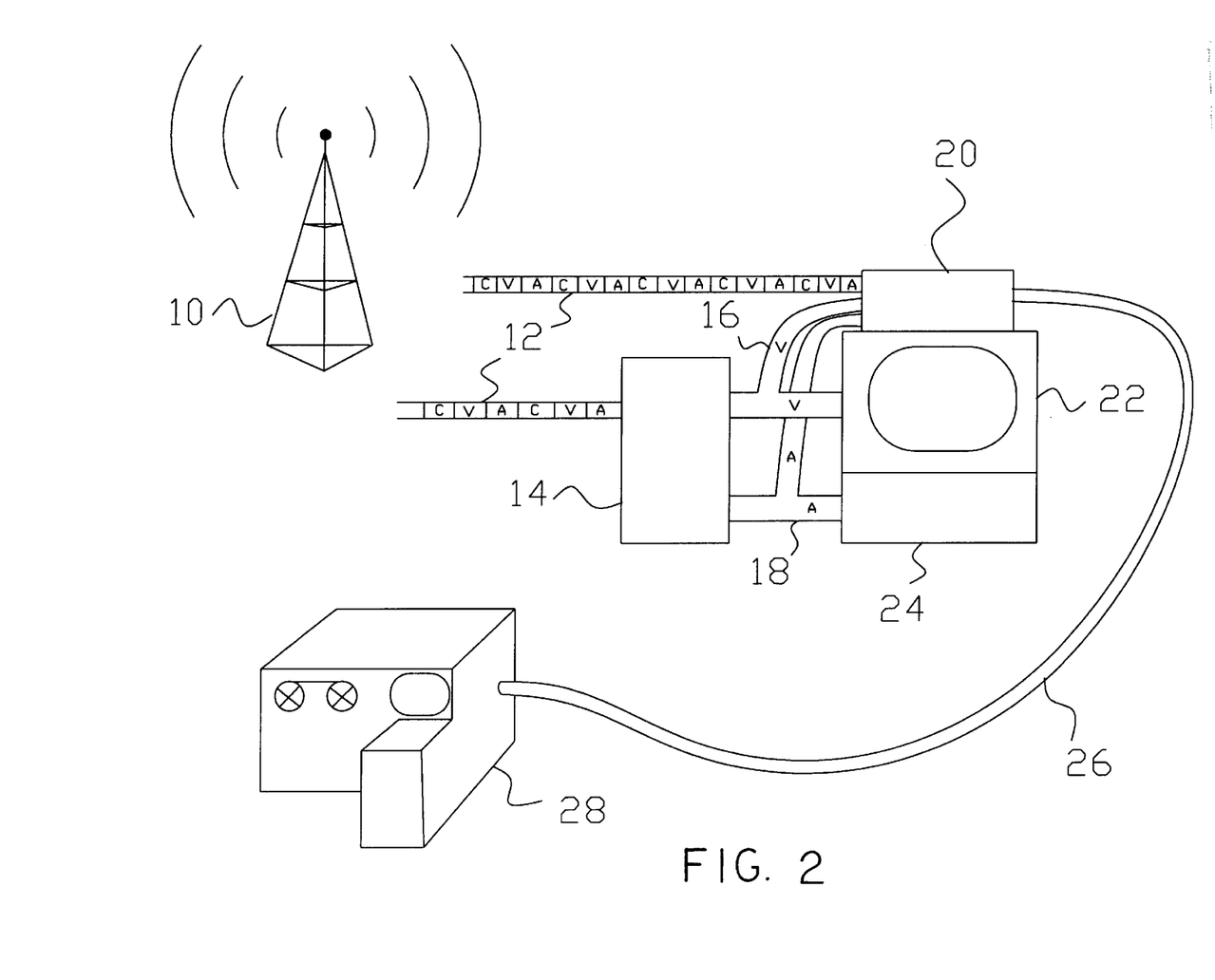
FIG. 2 is a schematic diagram showing the apparatus used in the first preferred embodiment of the invention.

FIG. 2 is a schematic diagram showing the apparatus used in the first preferred embodiment of the invention. The digital television station 10 broadcasts (or transmits by cable) a time-multiplexed digital stream 12 containing segments of a control stream C, a video stream V, and an audio stream A. (In practice many video and audio streams would normally be broadcast together in a single time-multiplexed stream, but for the sake of clarity, only a single channel with one of each is shown.) The multiplexed stream is then received and demultiplexed by an integrated receiver and decoder 14 into the control stream (not shown), the video stream 16, and the audio stream 18. The meter 20 independently receives the same multiplexed stream, and likewise demultiplexes it into the control stream and video and audio streams. The video stream of the channel selected is passed to both the cathode ray tube 22 (or liquid crystal display or other visual display device) and the meter, which compares it to each video stream in the multiplexed digital stream. The audio stream of the channel selected is passed to both the speaker 24 and the meter, which compares it to each audio stream in the multiplexed digital stream. (Of course, in the case of radio, there are no video streams to be compared).

The video stream received causes pictures to be displayed by the visual display device, and the audio stream received causes sounds to be emitted by the speaker. Information recorded by the meter may be stored in an internal memory unit for later retrieval. Optionally, in order to instantly generate audience ratings in real time, information recorded in the meter may be transmitted by a cable 26 or other means to a computer 28 where data from many different receivers being simultaneously monitored may be compiled.

Figure 3:
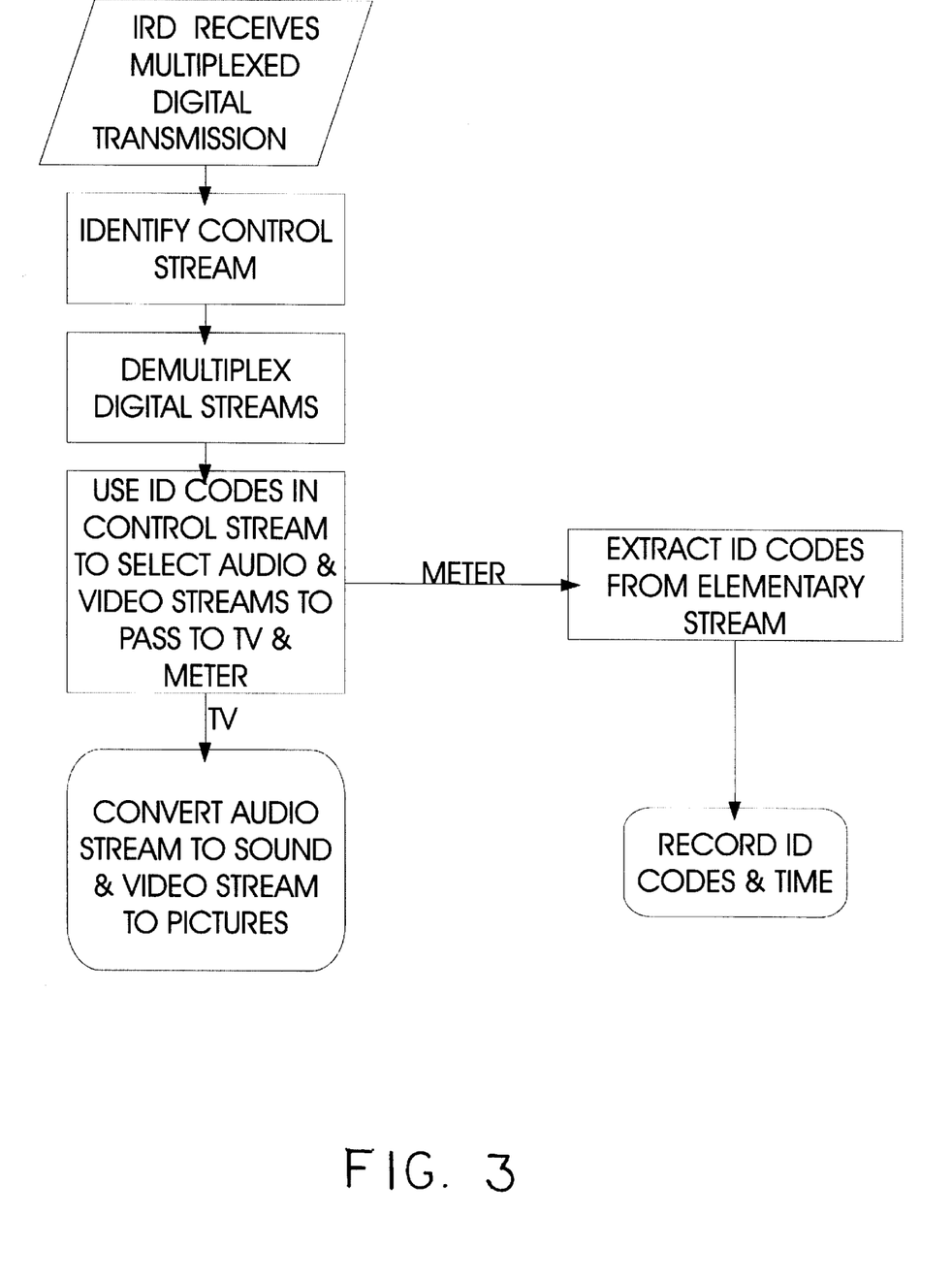
FIG. 3 is a flowchart showing the method of the second preferred embodiment of the invention.

FIG. 3 is a flowchart showing the method of the second preferred embodiment of the invention. In the second embodiment, only the IRD receives a multiplexed digital transmission, identifies its control stream, and demultiplexes the separate digital streams. As in the first embodiment, the IRD uses identification codes in the control stream to select the audio and video streams in the channel to which the receiver is tuned, and passes the streams to the receiver, where they are converted into sound and/or pictures. The IRD extracts the elementary stream for the channel (i.e., the audio, video and auxiliary streams for the channel, and the identification codes for these streams) and makes it available on an auxiliary connector (usually for the purpose of descrambling a controlled access channel) and passes it to the meter, which extracts the identification codes, and records them along with the time and date when the receiver is turned on or the channel that the receiver is tuned to is changed. As before, the meter also records the time when the receiver is turned off or reception is otherwise ended.

Figure 4:
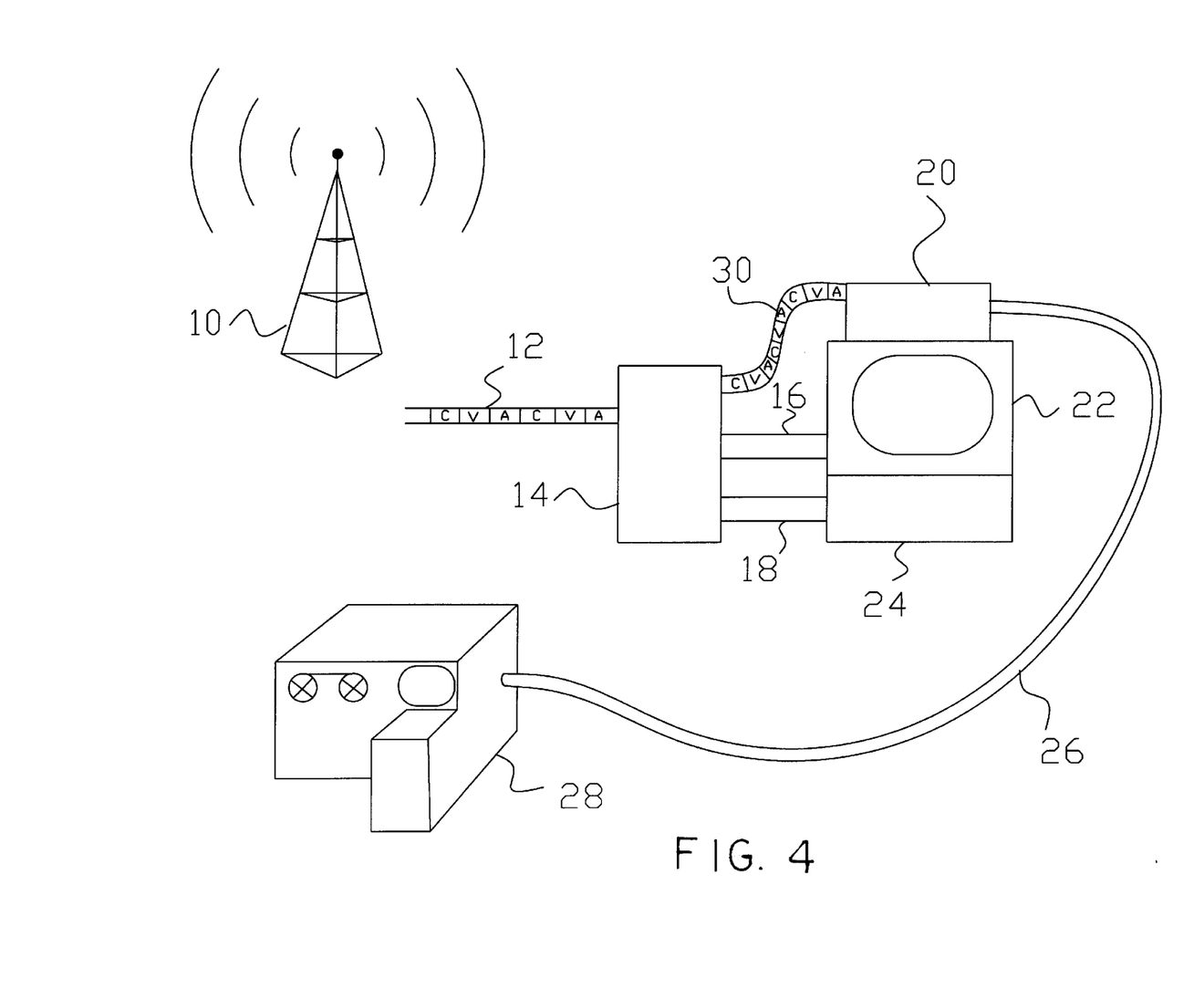
FIG. 4 is a schematic diagram showing the apparatus used in the second preferred embodiment of the invention.

FIG. 4 is a schematic diagram showing the apparatus used in the second preferred embodiment of the invention, showing that the multiplexed digital transmission 12 is received only by the IRC 14, which passes the elementary stream 30 (including an audio stream, a video stream, and identification codes) for the channel to which the receiver is tuned to the meter 20. In the second embodiment, the elementary stream may be accessed by the meter through an auxiliary connector in a digital decoder, or through an access control card connector, or by soldering an electrical connection to an internal point in the IRD.

In either embodiment, it is possible that a plurality of multiplexed digital transmissions can be received at different frequencies. In this case, when the receiver is turned on, the meter records a first frequency received, and the time reception of the first frequency begins, and when the frequency received is changed, the meter records any subsequent frequency received, and the time reception of the subsequent frequency begins.

Auxiliary streams for a channel may carry binary strings or text characters, by means of which information concerning the station or program being transmitted may be displayed by the receiver. Information concerning programs and/or stations may be displayed in a menu to enable viewers to select transmissions, or to enable viewer to see which transmissions have been selected.

The invention is primarily designed and intended for use in compiling audience rating reports, but may also be used in recording reception of, and billing customers for, pay-per-view digital television programs (or even "pay-per-listen" digital radio programs, should any be developed).

It is to be understood that the present invention is not limited to the preferred embodiments described above, but encompasses any and all embodiments within the scope of the following claims.

I claim:

1. An audience rating system for digital television and radio, comprising the steps of:

extracting at least one identification code for at least one digital stream of a first channel, from a control stream of a multiplexed digital transmission, when reception of the first channel by a receiver begins;

recording at least one identification code extracted and thus time reception of the first channel begins;

extracting at least one identification code for at least one digital stream of any subsequent channel, from the control stream of the multiplexed digital transmission, when reception of the subsequent channel by the receiver begins;

recording at least one identification code extracted and the time reception of the subsequent channel begins; and recording the time that reception by the receiver is ended.

2. An audience rating system for digital television and radio according to claim 1, wherein the multiplexed digital transmission is received separately by the receiver and by a meter;

when the receiver is turned on, and when the channel that the receiver is tuned to is changed, the meter compares digital streams of the channel that the receiver is tuned to, to digital streams of each of the channels in the multiplexed digital transmission, until it finds a match and extracts at least one identification code for at least one digital stream of the channel from the control stream, and records the identification code along with the time; and when reception by the receiver is ended, the meter records the time.

3. An audience rating system for digital television and radio according to claim 2, wherein a plurality of multiplexed digital transmissions can be received at different frequencies;

when the receiver is turned on, the meter records a first frequency received, and the time reception of the first frequency begins; and when the frequency received is changed, the meter records any subsequent frequency received, and the time reception of the subsequent frequency begins.

4. An audience rating system for digital television and radio according to claim 2, wherein the multiplexed digital transmission is transmitted by electromagnetic radiation.

5. An audience rating system for digital television and radio according to claim 2, wherein the multiplexed digital transmission is transmitted by electricity.

6. An audience rating system for digital television and radio according to claim 2, wherein data recorded by the meter are stored in a memory unit of the meter.

7. An audience rating system for digital television and radio according to claim 2, wherein data recorded by the meter are transmitted to a computer.

8. An audience rating system for digital television and radio according to claim 1, wherein when the receiver is turned on, and when the channel that the receiver is tuned to is changed, an elementary stream is extracted from the multiplexed digital transmission, the elementary stream is passed to a meter, the meter extracts at least one identification code from the elementary stream, and the meter records the identification code along with the time; and when reception by the receiver is ended, the meter records the time.

9. An audience rating system for digital television and radio according to claim 8, wherein the control stream is accessed by the meter through an auxiliary connector in a digital decoder.

10. An audience rating system for digital television and radio according to claim 8, wherein the control stream is accessed by the meter through an access control card connector.

11. An audience rating system for digital television and radio according to claim 8, wherein a plurality of multiplexed digital transmissions can be received at different frequencies;

when the receiver is turned on, the meter records a first frequency received, and the time reception of the first frequency begins; and when the frequency received is changed, the meter records any subsequent frequency received, and the time reception of the subsequent frequency begins.

12. An audience rating system for digital television and radio according to claim 8, wherein the multiplexed digital transmission is transmitted by electromagnetic radiation.

13. An audience rating system for digital television and radio according to claim 8, wherein the multiplexed digital transmission is transmitted by electricity.

14. An audience rating system for digital television and radio according to claim 8, wherein data recorded by the meter are stored in a memory unit of the meter.

15. An audience rating system for digital television and radio according to claim 8, wherein data recorded by the meter are transmitted to a computer.

16. An apparatus for audience rating of digital television and radio according to claim 1, wherein when the receiver is turned on, and when the channel that the receiver is tuned to is changed, an elementary stream is extracted from the multiplexed digital transmission, the elementary stream is passed to a meter, the meter extracts at least one identification code from the elementary stream, and the meter records the identification code along with the time; and when reception by the receiver is ended, the meter records the time.

17. A system for recording reception of pay programs on digital television and radio, comprising the steps of:

extracting at least one identification code for at least one digital stream of a first channel, from a control stream of a multiplexed digital transmission, when reception of the first channel by a receiver begins;

recording at least one identification code extracted and the time reception of the first channel begins;

extracting at least one identification code for at least one digital stream of any subsequent channel, from the control stream of the multiplexed digital transmission, when reception of the subsequent channel by the receiver begins;

recording at least one identification code extracted and the time reception of the subsequent channel begins; and recording the time that reception by the receiver is ended.

18. An apparatus for audience rating of digital television and radio, comprising:

means for extracting at least one identification code for at least one digital stream of a first channel, from a control stream of a multiplexed digital transmission, when reception of the first channel by a receiver begins;

means for recording at least one identification code extracted and the time reception of the first channel begins;

means for extracting at least one identification code for at least one digital stream of any subsequent channel, from the control stream of the multiplexed digital transmission, when reception of the subsequent channel by the receiver begins;

means for recording at least one identification code extracted and the time reception of the subsequent channel begins; and means for recording the time that reception by the receiver is ended.

19. An apparatus for audience rating of digital television and radio according to claim 18, wherein the multiplexed digital transmission is received separately by the receiver and by a meter;

when the receiver is turned on, and when the channel that the receiver is tuned to is changed, the meter compares digital streams of the channel that the receiver is tuned to, to digital streams of each of the channels in the multiplexed digital transmission, until it finds a match and extracts at least one identification code for at least one digital stream of the channel from the control stream, and records the identification code along with the time; and when reception by the receiver is ended, the meter records the time.

20. An apparatus for audience rating system of digital television and radio according to claim 19, wherein a plurality of multiplexed digital transmissions can be received at different frequencies;

when the receiver is turned on, the meter records a first frequency received, and the time reception of the first frequency begins; and when the frequency received is changed, the meter records any subsequent frequency received, and the time reception of the subsequent frequency begins.

* * * * *

(12) EX PARTE REEXAMINATION CERTIFICATE (5581st)
United States Patent
Massetti (10) Number: US 5,974,299 C1
(45) Certificate Issued: Oct. 24, 2006

(54) METHOD AND APPARATUS FOR MONITORING AUDIO-VISUAL MATERIALS PRESENTED TO A SUBSCRIBER

(75) Inventor: Enrico Emilio Massetti, 2432 Treemont Way, Dunedin, FL (US) 34698

(73) Assignee: Enrico Emilio Massetti, Dunedin, FL (US)

Reexamination Request:
No. 90/007,057, Jun. 1, 2004

Reexamination Certificate for:
| | |
|---|---|
| Patent No.: | 5,974,299 |
| Issued: | Oct. 26, 1999 |
| Appl. No.: | 09/085,501 |
| Filed: | May 27, 1998 |

(51) Int. Cl.
*H04N 7/16* (2006.01)
*H04N 9/00* (2006.01)

(52) U.S. Cl. .............................. 725/14; 725/9
(58) Field of Classification Search .............. 725/14–21
See application file for complete search history.

(56) References Cited

U.S. PATENT DOCUMENTS

| | | | | | |
|---|---|---|---|---|---|
| 4,885,632 | A | * | 12/1989 | Mabey et al. | 725/20 |
| 4,955,070 | A | * | 9/1990 | Welsh et al. | 455/2.01 |
| 5,426,701 | A | * | 6/1995 | Herrmann et al. | 380/52 |
| 5,459,789 | A | * | 10/1995 | Tamer et al. | 380/241 |
| 5,481,294 | A | * | 1/1996 | Thomas et al. | 725/20 |
| 5,801,747 | A | * | 9/1998 | Bedard | 725/46 |
| 5,872,588 | A | * | 2/1999 | Aras et al. | 725/14 |
| 6,675,383 | B1 | * | 1/2004 | Wheeler et al. | 725/19 |

OTHER PUBLICATIONS

U.S. Appl. No. 09/076,517, Lu, Kempter, and Feininger, "Audience Measurement System for Digital Television," filed May 12, 1998.*

"Program/Episode/Version Identification—ATSC Standard" Doc. A/57, Aug. 30, 1996.*

Non–final rejection of 09/076,517, mailed Nov. 19, 2002.*

Response to non–final rejection filed May 19, 2003, of 09/076,517 mailed Nov. 19, 2002.*

Final rejection of 09/076,517 mailed Aug. 11, 2003.*

* cited by examiner

*Primary Examiner*—Andrew Y. Koenig (57) ABSTRACT

An audience rating system for digital television and radio, using identification codes in control streams of time-multiplexed digital transmissions. When a television set or radio, that is being monitored pursuant to the system, is turned on and tuned into a channel, and each time that the channel is changed, an identification code for each audio, video or auxiliary digital stream of the channel is extracted from the control stream, and recorded along with the time. The time is also recorded when the television set or radio is turned off. This data makes it possible to determine what stations, channels, and programs members of the audience being monitored are watching or listening to at any particular time. In the first preferred embodiment, the multiplexed digital transmission is received separately by the television set or radio (or an attached IRD) and a meter connected to it. The meter compares digital streams of the channel being received by the television set or radio with digital streams of each of the channels in the multiplexed digital transmission, until it finds a match. In the second preferred embodiment, the meter does not receive the multiplexed digital transmission separately, but has access to elementary streams extracted from the transmission by an IRD, and extracts identification codes for the channels being received from their elementary streams. The elementary stream may be accessed through an auxiliary connector in a digital decoder, through an access control card connector, or through soldering electrical connections to internal points in the IRD.

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4–6 and 12–14 are cancelled.

Claims 1–3, 7–11 and 15–18 are determined to be patentable as amended.

Claims 19 and 20, dependent on an amended claim, are determined to be patentable.

New claims 21–26 are added and determined to be patentable.

1. [An audience rating system] *A method for rating audiences* for digital television and radio, comprising the steps of:
   extracting at least one *first* identification code for at least one digital stream of a first channel, from a control stream of a multiplexed digital transmission, when reception of the first channel by a receiver begins;
   recording *the* at least one *first* identification code extracted and the time reception [of] *when* the first channel begins;
   extracting at least one *second* identification code for at least one digital stream of any subsequent channel, from the control stream of the multiplexed digital transmission, when reception of the subsequent channel by the receiver begins;
   recording *the* at least one *second* identification code extracted and the time reception [of] *when* the subsequent channel begins; and
   recording the time that reception by the receiver is ended;
   *wherein the control stream is used to allocate digital frames to the digital streams, said digital streams including at least one audio stream for each channel and said control stream;*
   *wherein each of the identification codes in the control stream is used to select the digital streams of the channel to which the receiver is tuned to be passed to the receiver, and the identification codes in the control stored are used for rating audiences; and*
   *wherein at least one said audio stream is converted to sound.*

2. [An audience rating system] *A method for rating audiences* for digital television and radio according to claim 1, wherein the multiplexed digital transmission is received separately by the receiver and by a meter;
   when the receiver is turned on, and when the channel that the receiver is tuned to is changed, the meter compares digital streams of the channel that the receiver is tuned to, to digital streams of each of the channels in the multiplexed digital transmission, until it finds a match and extracts at least one identification code for at least one digital stream of the channel from the control stream, and records the identification code along with the time; and
   when reception by the receiver is ended, the meter records the time.

3. [An audience rating system] *A method for rating audiences* for digital television and radio according to claim 2, wherein a plurality of multiplexed digital transmissions can be received at different frequencies;
   when the receiver is turned on, the meter records a first frequency received, and the time reception of the first frequency begins; and
   when the frequency received is changed, the meter records any subsequent frequency received, and the time reception of the subsequent frequency begins.

7. [An audience rating system] *A method for rating audiences* for digital television and radio according to claim 2, wherein:
   *the multiplexed digital transmission is transmitted by means selected from the group comprising electromagnetic radiation and electricity;*
   data recorded by the meter are *stored in a memory unit of the meter and* transmitted to a computer.

8. [An audience rating system] *A method for rating audiences* for digital television and radio according to claim 1, wherein
   when the receiver is turned on, and when the channel that the receiver is tuned to is changed, an elementary stream is extracted from the multiplexed digital transmission, the elementary stream is passed to a meter, the meter extracts at least one identification code from the elementary stream, and the meter records the identification code along with the time; and
   when reception by the receiver is ended, the meter records the time.

9. [An audience rating system] *A method for rating audiences* for digital television and radio according to claim 8, wherein the control stream is accessed by the meter through an auxiliary connector in a digital decoder.

10. [An audience rating system] *A method for rating audiences* for digital television and radio according to claim 8, wherein the control stream is accessed by the meter through an access control card connector.

11. [An audience rating system] *A method for rating audiences* for digital television and radio according to claim 8, wherein a plurality of multiplexed digital transmissions can be received at different frequencies;
   when the receiver is turned on, the meter records a first frequency received, and the time reception of the first frequency begins; and
   when the frequency received is changed, the meter records any subsequent frequency received, and the time reception of the subsequent frequency begins.

15. [An audience rating system] *A method for rating audiences* for digital television and radio according to claim 8, wherein:
   *the multiplexed digital transmission is transmitted by means selected from the group comprising electromagnetic radiation and electricity;*
   data recorded by the meter are *stored in a memory unit of the meter and* transmitted to a computer.

16. [An audience rating system] *A method for rating audiences* of digital television and radio according to claim 1, wherein when the receiver is turned on, and when the channel that the receiver is tuned to is changed, an elementary stream is extracted from the multiplexed digital transmission, the elementary stream is passed to a meter, the meter extracts at least one identification code from the elementary stream, and the meter records the identification code along with the time; and when reception by the receiver is ended, the meter records the time.

17. A [system for recording reception] *method for recording reception* of pay programs on digital television and radio, comprising the steps of:

extracting at least one *first* identification code for at least one digital stream of a first channel, from a control stream of a multiplexed digital transmission, when reception of the first channel by a receiver begins;

recording *the* at least one *first* identification code extracted and the time reception [of] *when* the first channel begins;

extracting at least one *second* identification code for at least one digital stream of any subsequent channel, from the control stream of the multiplexed digital transmission, when reception of the subsequent channel by the receiver begins;

recording *the* at least one *second* identification code extracted and the time reception [of] *when* the subsequent channel begins; and recording the time that reception by the receiver is ended;

*wherein the control stream is used to allocate digital frames to the digital streams, said digital streams including at least one audio stream for each channel and said control stream;*

*wherein each of the identification codes in the control stream is used to select the digital streams of the channel to which the receiver is tuned to be passed to the receiver, and the identification codes in the control stored are used for rating audiences; and*

*wherein at least one said audio stream is converted to sound.*

18. An apparatus for audience rating of digital television and radio, comprising:

means for extracting at least one *first* identification code for at least one digital stream of a first channel, from a control stream of a multiplexed digital transmission, when reception of the first channel by a receiver begins;

means for recording *the* at least one *first* identification code extracted and the time reception [of ] *when* the first channel begins;

means for extracting at least one *second* identification code for at least one digital stream of any subsequent channel, from the control stream of the multiplexed digital transmission, when reception of the subsequent channel by the receiver begins;

means for recording *the* at least one *second* identification code extracted and the time reception [of] *when* the subsequent channel begins; and means for recording the time that reception by the receiver is ended;

*wherein the control stream is used to allocate digital frames to the digital streams, said digital streams including at least one audio stream for each channel and said control stream;*

*wherein each of the identification codes in the control stream is used to select the digital streams of the channel to which the receiver is tuned to be passed to the receiver, and the identification codes in the control stored are used for rating audiences; and*

*wherein at least one said audio stream is converted to sound.*

*21. A method for rating audiences for digital television and radio according to claim 1, including an auxiliary stream for each channel.*

*22. A method for rating audiences for digital television and radio according to claim 1, wherein:*

*said digital streams include at least one video stream for each channel; and*

*at least one of said digital streams is converted to pictures.*

*23. A method for rating audiences for digital television and radio according to claim 17, including an auxiliary stream for each channel.*

*24. A method for rating audiences for digital television and radio according to claim 17, wherein:*

*said digital streams include at least one video stream for each channel; and*

*at least one of said digital streams is converted to pictures.*

*25. An audience rating system for digital television and radio according to claim 18, including an auxiliary stream for each channel.*

*26. An audience rating system for digital television and radio according to claim 18, wherein:*

*said digital streams include at least one video stream for each channel; and*

*at least one of said digital streams is converted to pictures.*

\* \* \* \* \*